June 29, 1965    R. E. SANSOM    3,192,418

ULTRASONIC TRANSDUCERS

Filed Feb. 26, 1960

United States Patent Office 3,192,418
Patented June 29, 1965

3,192,418
ULTRASONIC TRANSDUCERS
Raymond E. Sansom, New Milford, Conn., assignor, by mesne assignments, to Automation Industries, Inc., El Segundo, Calif., a corporation of California
Filed Feb. 26, 1960, Ser. No. 11,289
6 Claims. (Cl. 310—8.7)

This invention relates to ultrasonic transducers which are adapted to transmit and receive ultrasonic vibrations either in the form of continuous oscillations or pulses. For this purpose a piezoelectric element may be employed as a transmitter, the element being energized by high frequency electrical oscillations which it converts into mechanical oscillations of the same frequency. When such element receives mechanical oscillations it converts them into electrical oscillations. Ultrasonic oscillations thus generated have many uses, as for instance, in non-destructive testing of materials where high frequency ultrasonic pulses are transmitted into a test piece and any reflections from within the test piece caused by the presence of internal defects will be received by the piezoelectric element. The voltages generated by the received reflections are amplified and indicated in any suitable manner, as, for instance, upon the sweep of an oscilloscope.

In many uses of the ultrasonic transducer it is desirable, and sometimes essential, that more than one beam be transmitted simultaneously. In the aforementioned use of the beam for internal testing of objects, for example, multiple beams are frequently required in order to detect defects lying at various angles so that at least one beam will be reflected back to the transducer. Heretofore this condition was met by the use of a plurality of piezoelectric elements, with consequent complication of structure, difficulty in properly arranging them for transmission in the required directions, as well as increased expense and maintenance.

It is therefore one of the principal objects of this invention to provide means whereby a plurality of beams may be transmitted simultaneously at a plurality of different angles by a single piezoelectric element.

Further objects and advantages of this invention will become apparent in the following detailed description thereof.

In the accompanying drawings.

Figure 1:
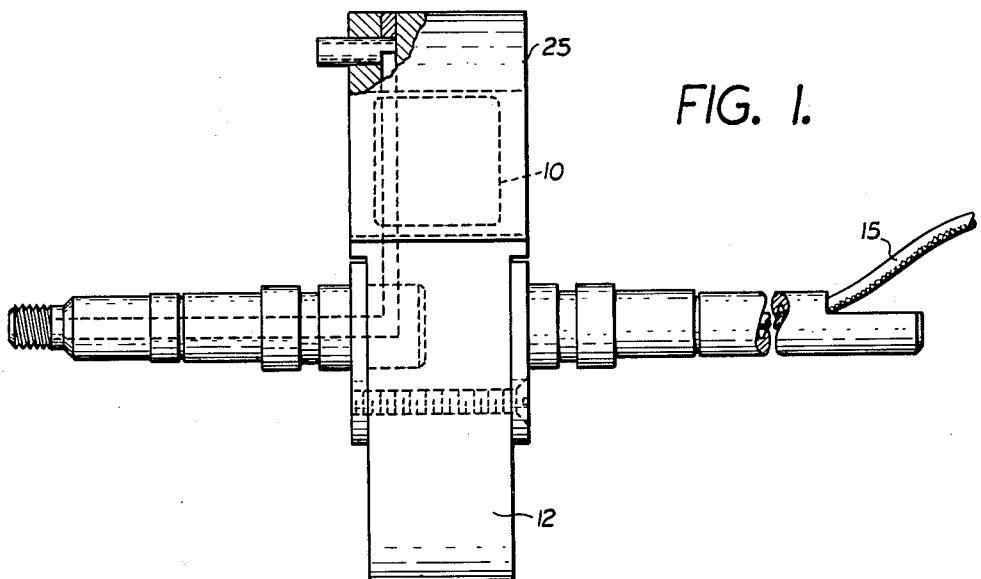
FIG. 1 is a front elevation of a transducer embodying this invention.

Referring to the drawings, there is shown one form of transducer embodying my invention. In this case a pair of piezoelectric elements 10, 10', which may be quartz crystals, are mounted on opposite sides of a backing member 11 made, for example, of a material of high acoustical attenuation, such as a slate-filled epoxy resin. Backing or damping member 11 is carried by a suitable support 12 into which leads a cable 15 for carrying the electric connections to the elements. The other end of the cable is connected to apparatus (not shown) for generating pulses or wave trains of ultrasonic signal energy and for receiving reflected signal energy utilized to provide indications of discontinuities in the test object. For example, apparatus of the type disclosed in Patent No. 2,398,701 may be employed.

The invention is shown as applied to the problem of testing a railroad rail R which is formed at its ends with bolt holes 20. These bolt holes develop cracks, such as 21, radiating therefrom in different directions, and therefore in order to detect all of them it is necessary to transmit a plurality of ultrasonic beams in various directions so that at least one beam will strike the bolt hole crack normally and be reflected back to the transmitting crystal for detection. In the illustration, it is desirable to transmit two beams at different angles to the normal axis. This would ordinarily present a difficult problem because two crystals would have to be employed at the sending station.

The foregoing problem is here solved in the following manner. An arcuate reflector 25 is mounted on the backing member 11 so as to provide reflecting surfaces on its under side cooperating with each crystal. Any material which reflects ultrasonic energy, such as steel, may be used. Instead of one reflecting surface cooperating with each crystal, the under surface of the reflector is formed with a plurality of reflecting surfaces, in this case two, 26, 27 and 26', 27', cooperating with each crystal. Thus, one of the reflecting surfaces 26, 26' cooperates with the upper portion of the respective crystal and is positioned to reflect beams A, C, while the other of the reflecting surfaces 27, 27' cooperates with the lower portion of the respective crystal and transmits beams C, D. After refraction in the rail beams A and C will enter the test piece at sufficiently different angles so that at least one beam will strike the defect substantially normally and be returned to the sending crystal. In the case shown, beam A will be returned to the transmitting crystal where it will generate a voltage which is utilized to operate an indicator, whereas beam B will be reflected in such direction as to give no useful indication.

Figure 2:
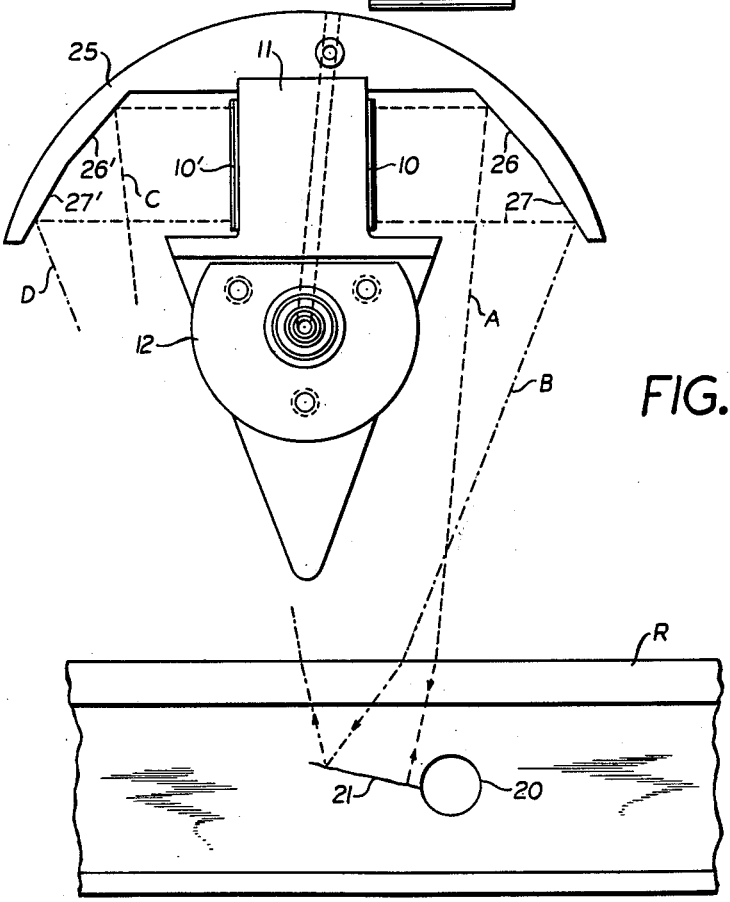
FIG. 2 is a side elevation of the transducer shown as applied to the inspection of bolt-hole cracks in rails in track.

For convenience in testing, the apparatus shown in FIGS. 1 and 2 may be mounted within a rotatable container filled with an appropriate couplant, for example, as shown in Patent No. 2,545,101. The container, usually in the form of a wheel, may be constructed of a rubber or an appropriate material which is substantially transparent, in the thickness used, to ultrasonic energy and the couplant may be water. The wheel runs on the test object and couplant is introduced between the wheel and the test object.

Alternatively the apparatus of FIGS. 1 and 2 may be immersed together with the test object in a tank of suitable liquid, usually water.

In a practical embodiment of the invention utilized for testing railroad rails, the two beams (corresponding to beams A and B) enter the railhead at angles of 30° and 37½°. The angles of the reflectors are appropriately selected in a known manner in view of the velocities in the rail material and in the liquid in which the assembly is immersed. For example, to test a steel rail using a liquid having a velocity of $1.705 \times 10^5$ centimeters per second, the reflectors 26 and 27 are positioned relative to element 10 to provide angles of 15°10' and 18°35' for the beams A and B, respectively, as measured with respect to normal.

If desired, instead of using a pair of crystal elements 10, 10', a single crystal element may be used. In this case, the crystal is edge mounted and energy from one face is directed toward reflectors 26, 27 while energy from the opposite face is directed toward reflectors 26', 27' as disclosed in application Serial No. 719,424 filed March 5, 1958.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

Having described my invention, what I claim and desire to secure by Letters Patent is:

1. An ultrasonic transducer for use in ultrasonically inspecting a test object comprising an element having an energy-emitting face and adapted when energized to generate an ultrasonic beam propagating from said face, and reflector means comprising a plurality of plane reflecting surfaces operatively associated with said face and disposed in the path of said beam, at predetermined different absolute angles to reflect a plurality of essentially discrete beams propagating into the test object in predetermined different directions.

2. An ultrasonic transducer for use in ultrasonically inspecting a test object comprising an element having an energy-emitting face and adapted when energized to generate an ultrasonic beam propagating from said face, and reflector means comprising a plurality of plane reflecting surfaces operatively associated with said face and disposed in the path of said beam and adapted to cooperate with selected portions of the beam, said reflecting surfaces being oriented at predetermined different absolute angles to reflect a plurality of essentially discrete beams propagating into the test object in predetermined different directions.

3. An ultrasonic transducer for use in ultrasonically inspecting a test object comprising an element having an energy-emitting face and adapted when energized to generate an ultrasonic beam propagating from said face, a support for said element, a reflector mounted on said support and having a plurality of plane reflecting surfaces operatively associated with said face and disposed in the path of said beam at predetermined different absolute angles to reflect a plurality of essentially discrete beams propagating into the test object in predetermined different directions.

4. An ultrasonic transducer for use in ultrasonically inspecting a test object comprising an element having an energy-emitting face and adapted when energized to generate an ultrasonic beam propagating from said face, a support for said element, a reflector mounted on said support having a plurality of plane reflecting surfaces operatively associated with said face and disposed in the path of said beam for cooperation with selected portions of the beam, said reflecting surfaces being oriented at predetermined different absolute angles to reflect a plurality of essentially discrete beams propagating into the test object in predetermined different directions.

5. An ultrasonic transducer for use in ultrasonically inspecting a test object comprising a pair of elements having a pair of energy-emitting faces and adapted when energized to generate ultrasonic beams propagating from said faces in opposite directions, a support for said elements, a reflector mounted on said support and having a plurality of reflecting surfaces disposed in two groups each operatively associated with one of said faces in the path of the corresponding beam, at predetermined different absolute angles to reflect a plurality of essentially discrete beams from each original beam propagating into the test object in predetermined different directions.

6. An ultrasonic transducer for use in ultrasonically inspecting a test object comprising a pair of elements having a pair of energy-emitting faces and adapted when energized to generate ultrasonic beams propagating from said faces in opposite directions, a support for said elements, a reflector mounted on said support and having a plurality of reflecting surfaces disposed in two groups each operatively associated with one of said faces in the path of the corresponding beam for cooperation with selected portions thereof, the reflecting surfaces cooperating with each beam being oriented at predetermined different absolute angles to reflect a plurality of essentially discrete beams from each original beam propagating into the test object in predetermined different directions.

References Cited by the Examiner
UNITED STATES PATENTS

| | | | |
|---|---|---|---|
| 2,628,335 | 2/53 | Drake | 310—9.1 |
| 2,855,526 | 10/58 | Jones | 310—8.3 |
| 3,028,752 | 4/62 | Bacon | 310—8.7 |
| 3,106,839 | 10/63 | Sansom | 310—8.7 |

MILTON O. HIRSHFIELD, *Primary Examiner.*

IRVING L. SRAGOW, *Examiner.*